United States Patent
Bhaskaran et al.

(10) Patent No.: US 12,373,430 B2
(45) Date of Patent: Jul. 29, 2025

(54) METHODS AND SYSTEMS FOR DETERMINING REGRESSION OF A DATABASE QUERY

(71) Applicant: FMR LLC, Boston, MA (US)

(72) Inventors: Deepak Bhaskaran, Cary, NC (US); Mark Rogers, Manchester, NH (US); Harini Varadarajan, Apex, NC (US); Shiv Shankar Kumar, Plano, TX (US); Midhun Gandhi Thiagarajan, Cary, NC (US); Swathi Enugula, New Hill, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/625,814

(22) Filed: Apr. 3, 2024

(65) Prior Publication Data

US 2025/0094422 A1 Mar. 20, 2025

Related U.S. Application Data

(60) Provisional application No. 63/539,411, filed on Sep. 20, 2023.

(51) Int. Cl.
*G06F 16/245* (2019.01)
*G06F 16/2453* (2019.01)

(52) U.S. Cl.
CPC .................. *G06F 16/24542* (2019.01)

(58) Field of Classification Search
None
See application file for complete search history.

(56) References Cited

U.S. PATENT DOCUMENTS

| | | | | |
|---|---|---|---|---|
| 9,262,477 | B1* | 2/2016 | Gu | G06F 16/24542 |
| 2007/0050330 | A1* | 3/2007 | Karn | G06F 16/284 |
| 2008/0256025 | A1* | 10/2008 | Bestgen | G06F 16/903 |
| | | | | 707/E17.135 |
| 2009/0077017 | A1* | 3/2009 | Belknap | G06F 16/217 |
| 2010/0114868 | A1* | 5/2010 | Beavin | G06F 16/24542 |
| | | | | 707/718 |
| 2010/0306591 | A1* | 12/2010 | Krishna | G06F 16/24549 |
| | | | | 707/E17.017 |

(Continued)

FOREIGN PATENT DOCUMENTS

WO WO-2021169322 A1 * 9/2021

*Primary Examiner* — Augustine K. Obisesan
(74) *Attorney, Agent, or Firm* — Cesari and McKenna, LLP

(57) ABSTRACT

A method for determining regression of a database query associated with a first execution plan includes receiving a first performance measure for the database query and the first execution plan; determining a presence of at least one stored performance measure for the database query in a data repository; adding the first performance measure and identifiers for the database query and the first execution plan to a synchronization list; retrieving a second performance measure associated with a second execution plan from the data repository; determining a regression of the database query by comparing the first performance measure to the second performance measure; in response to a determination that the database query is regressed, adding the first performance measure, the second performance measure, and identifiers for the database query and the first execution plan to a regression report.

20 Claims, 7 Drawing Sheets

(56) References Cited

U.S. PATENT DOCUMENTS

| | | | |
|---|---|---|---|
| 2020/0134070 A1* | 4/2020 | Sidoti | G06F 16/24542 |
| 2022/0027754 A1* | 1/2022 | Singh | G06N 99/00 |
| 2024/0126607 A1* | 4/2024 | Royal | G06F 9/5038 |

* cited by examiner

SQLSTAT / 502

| SNAP_ID | SQL_ID | BEGIN | END | SCHEMA | PHV | EXEC_DELTA | ELAP_TIME_DELTA | BUFFER_GETS_DELTA | ROWS_DELTA |
|---|---|---|---|---|---|---|---|---|---|
| 342598 | 0antcmup72gy9 | 1:00 | 1:15 | PBOALERTS | 152314801 | 385 | 1425884420 | 499953 | 386 |
| 342598 | 1q9wwwlktku6x | 1:00 | 1:15 | APPDBO | 1141183072 | 19 | 20708899 | 9244 | 121 |
| 342598 | 5r9a95d4z4umt | 1:00 | 1:15 | REFDBO | 1180091202 | 78 | 62329637 | 815879 | 78 |
| 342598 | 64bl8kq39n2x2 | 1:00 | 1:15 | APPDBO | 3556505223 | 1024 | 268865028 | 3376010 | 454182 |
| 342598 | 8dsbnqh5qmhwf | 1:00 | 1:15 | APPDBO | 847866518 | 270 | 710369952 | 976002 | 50137 |
| 342598 | 973xkz1bmm4x5 | 1:00 | 1:15 | APPDBO | 66384162 | 2 | 625323596 | 3503824 | 104 |
| 342598 | 9sthufx616c5w | 1:00 | 1:15 | PBDBO | 2637957023 | 17207 | 87575205 | 41454251 | 133588 |
| 342598 | afhbrdc71fucr | 1:00 | 1:15 | REFDBO | 3033505793 | 7757 | 18320428 | 63118 | 7757 |

REGRESSION REPORT TABLE

| SNAP_ID | SQL_ID | MODULE | SCHEMA | EXECUTIONS | CURR_PHV | BEST_PHV | CURR_ELAP_EXEC | BEST_ELAP_EXEC | CURR_GETS_EXEC | BEST_GETS_EXEC | RGR_IN_SECS |
|---|---|---|---|---|---|---|---|---|---|---|---|
| 342598 | 0antcmup72gy9 | JDBC Thin Client | PBOALERTS | 385 | 152314801 | 1809084234 | 3701596 | 449 | 1299 | 36 | 1429 |
| 342598 | 8dsbnqh5qmhwf | load_portfolio_summ | APPDBO | 270 | 847866518 | 1307615859 | 2631206 | 462994 | 3615 | 3764 | 585 |
| 342598 | 973xkz1bmm4x5 | JDBC Thin Client | APPDBO | 2 | 66384162 | 1097363058 | 312681796 | 114675789 | 1751913 | 1808468 | 395 |
| 342598 | 64bl8kq39n2x2 | JDBC Thin Client | APPDBO | 1024 | 3556505223 | 3556505223 | 282564 | 70196 | 3297 | 4154 | 196 |

METHODS AND SYSTEMS FOR DETERMINING REGRESSION OF A DATABASE QUERY

RELATED APPLICATION(S)

This application claims priority to U.S. Provisional Patent Application No. 63/539,411, filed on Sep. 20, 2023, the entirety of which is incorporated herein by reference.

TECHNICAL FIELD

This application relates generally to database systems, and more particularly to methods of determining regression of a database query executed by a database system.

BACKGROUND

Databases managed by database management systems are often queried using the Structured Query Language (SQL). To execute a SQL query, the database management system or database system often generates an execution plan for the query. An execution plan is a set of low-level instructions defining how to execute the query associated with it. The execution plan is generated by the database system based on a variety of factors, such as database statistics, a query process tree, the tables, rows, and columns accessed, and/or other constraints given to the database system. However, the database system may generate an execution plan that is not fast or not convenient and leads to slower response times and/or regression of the associated query. Current database management systems do not monitor or check for query regression. Therefore, such regression may not be noticed until it impacts a customer that interacts with the data provided by that query.

SUMMARY

The deficiencies of the prior art described above are overcome by providing a system and method that enables determining regression of a database query based on monitoring metrics for that query. In accordance with an embodiment of the present invention, a computer-implemented method for determining regression of a database query associated with a first execution plan, using a computer system coupled to a data repository, includes receiving, by the computer system, a first performance measure for the database query and the first execution plan. The method includes determining, by the computer system, a presence of at least one stored performance measure for the database query in the data repository. The method also includes, in response to a determination that at least one stored performance measure for the database query is not present in the repository, adding, by the computer system, the first performance measure and identifiers for the database query and the first execution plan to a synchronization list. In response to a determination that at least one stored performance measure for the database query is present in the data repository, the method includes retrieving, by the computer system, a second performance measure associated with a second execution plan from the data repository. The method includes determining, by the computer system, a regression of the database query by comparing the first performance measure to the second performance measure. The method includes, in response to a determination that the database query is regressed, adding, by the computer system, the first performance measure, the second performance measure, and identifiers for the database query and the first execution plan to a regression report.

Alternatively, or in addition, the method further includes, for each database query, associated first execution plan, and associated first performance measure in the synchronization list: retrieving, by the computer system, a repository list including identifiers for one or more third execution plans and third performance measures associated with the database query from the data repository. The method includes adding, by the computer system, an identifier for the first execution plan and the first performance measure to the repository list. The method includes sorting, by the computer system, the repository list. The method also includes storing, by the computer system, the sorted repository list in the data repository. The sorting may be based on the first and third performance measures.

Also alternatively, or in addition, the first and second performance measures include execution time. The second performance measure may include the shortest execution time of all performance measures associated with the database query in the data repository.

Alternatively, or in addition, receiving the first performance measure is based on an automatic workload repository snapshot. The method may be executed periodically by the computer system. The first performance measure may be associated with a time period since a previous execution of the method.

Alternatively, or in addition, determining the regression of the database query is further based on a threshold. Determining the regression of the database query may include determining one or both of a latency and an execution count of the database query.

In accordance with another embodiment of the present invention, a system for determining regression of a database query associated with a first execution plan includes a computer system having a processor coupled to a memory. The system also includes a data repository coupled to the computer system. The processor is configured to receive a first performance measure for the database query and the first execution plan. The processor is configured to determine a presence of at least one stored performance measure for the database query in the data repository. The processor is configured to, in response to a determination that at least one stored performance measure for the database query is not present in the repository, add the first performance measure and identifiers for the database query and the first execution plan to a synchronization list. In response to a determination that at least one stored performance measure for the database query is present in the data repository, the processor is configured to retrieve a second performance measure associated with a second execution plan from the data repository. The processor is configured to determine a regression of the database query by comparing the first performance measure to the second performance measure. The processor is configured to, in response to a determination that the database query is regressed, add the first performance measure, the second performance measure, and identifiers for the database query and the first execution plan to a regression report.

Alternatively, or in addition, the processor is further configured to, for each database query, associated first execution plan, and associated first performance measure in the synchronization list: retrieve a repository list including identifiers for one or more third execution plans and third performance measures associated with the database query from the data repository. The processor is configured to add an identifier for the first execution plan and the first performance measure to the repository list. The processor is configured to sort the repository list. The processor is configured to store the sorted repository list in the data repository. The processor may be configured to sort the repository list based on the first and third performance measures.

Also alternatively, or in addition, the first and second performance measures include execution time. The second performance measure may include the shortest execution time of all performance measures associated with the database query in the data repository.

Alternatively, or in addition, the processor is configured to receive the first performance measure from an automatic workload repository snapshot. The first performance measure may be associated with a time period.

Also alternatively, or in addition, the processor is configured to determine the regression of the database query based on a threshold. The processor may be configured to determine the regression of the database query based on one or both of a latency and an execution count of the database query.

In accordance with yet another embodiment of the present invention, a non-transitory computer-readable medium has software encoded thereon. The software, when executed by one or more computer systems coupled to a data repository, is operable to receive a first performance measure for a database query and a first execution plan associated with the database query. The software is operable to determine a presence of at least one stored performance measure for the database query in the data repository. The software is operable to, in response to a determination that at least one stored performance measure for the database query is not present in the repository, add the first performance measure and identifiers for the database query and the first execution plan to a synchronization list. In response to a determination that at least one stored performance measure for the database query is present in the data repository, the software is operable to retrieve a second performance measure associated with a second execution plan from the data repository. The software is operable to determine a regression of the database query by comparing the first performance measure to the second performance measure. The software is operable to, in response to a determination that the database query is regressed, add the first performance measure, the second performance measure, and identifiers for the database query and the first execution plan to a regression report.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 5 shows exemplary query statistics and an exemplary regression report in accordance with an embodiment of the present invention.

DETAILED DESCRIPTION

Figure 1:
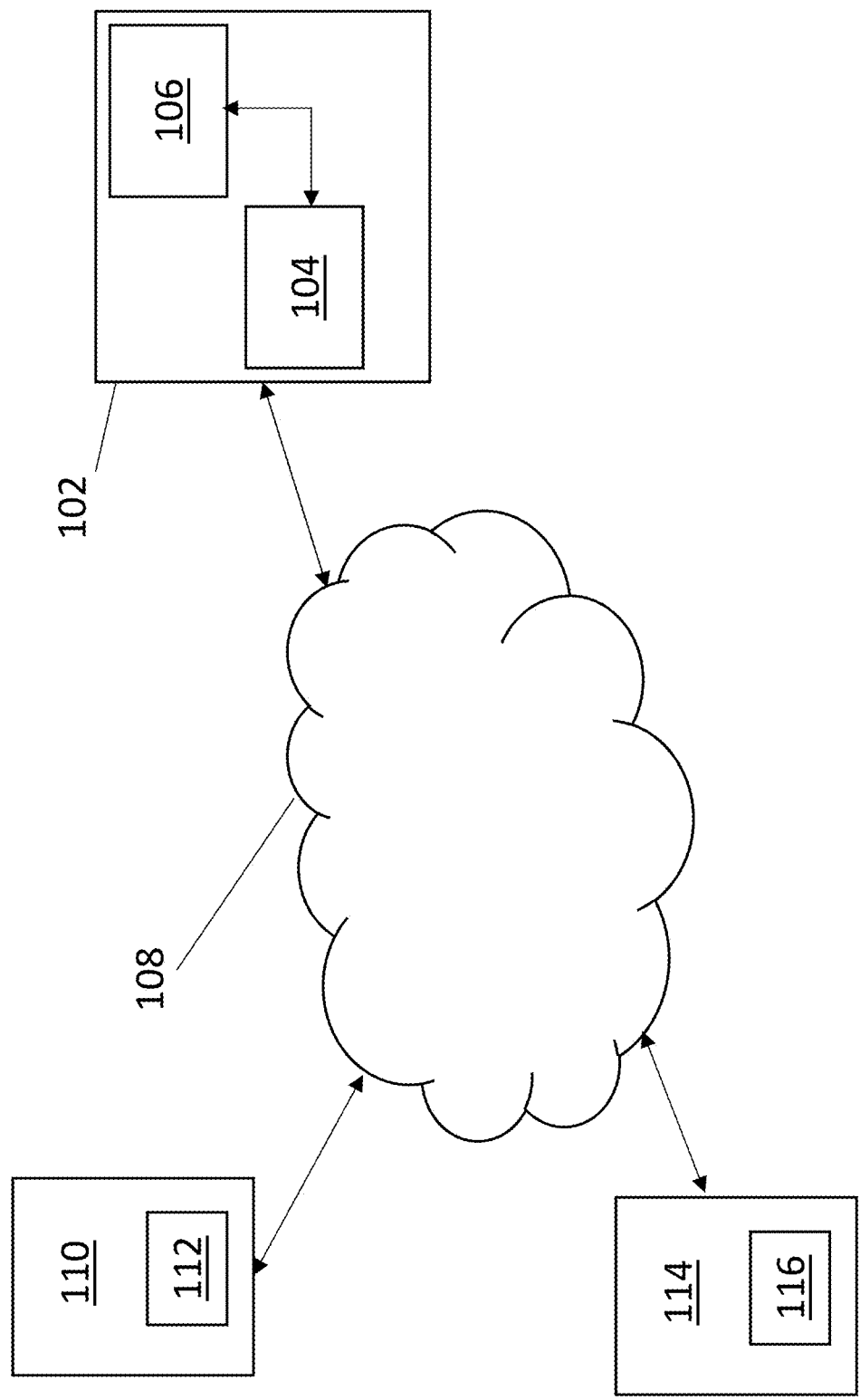
FIG. 1 is an illustration of a system for determining regression of a database query in accordance with an embodiment of the present invention.

FIG. 1 is an illustration of a system 100 for determining regression of a database query in accordance with an embodiment of the present invention. System 100 includes a computer system 102. The computer system 102 has a processor 104 coupled to a memory 106. The computer system 102 is also communicatively coupled to a communications network 108. Network 108 may be a public network, such as the internet, or it may be a private network, such as a network internal to a company. Network 108 also may be a combination of public and/or private networks. The computer system 102 may be coupled to the network 108 directly, for example via an Ethernet cable or via wireless connection such as WiFi™. Computer system 102 may also be coupled to the network 108 in any other way known to the skilled person, for example indirectly through another device (not shown), such, as, but not limited to, a router, a switch, a hub, a separate computer system, a mobile device, a modem, and/or a combination of these devices. The processor 104 is configured to execute portions of the method described below in detail with reference to FIGS. 2 and 3.

Further coupled to the network 108 is a database system 110. The database system 110 provides a database 112 and is configured to execute database queries on the database 112 according to one or more execution plans. In some embodiments, the database system 110 may be part of computer system 102. In other embodiments, as shown here, the database system 110 may be coupled to the network 108 directly or indirectly in any way known to the skilled person and may be communicatively coupled to the computer system 102 over the network 108. The database 112 may be a part of the database system 110 as shown, but it may also be communicatively coupled to the database system 110, for example over the network 108. The database system 110 is configured to execute database queries on the data in the database 112. A database query may be associated with one or more execution plans. A database query may, for example, be written in Structured Query Language (SQL). As is known to the skilled person, an execution plan associated with that database query is a set of low-level instructions for the database system 110 as to how to execute the database query.

Also coupled to the network 108 is a data repository system 114. The data repository 114 includes a data repository 116. Similar to the computer system 102 and the database system 110, the data repository system 114 may be coupled to the network 108 directly or indirectly in any way known to the skilled person. The data repository system 114 is configured to receive data from computer system 102 over the network 108 and store it in the data repository 116. The data repository system 114 is also configured to retrieve data from the data repository 116 and send it over network 108 to computer system 102. The data repository 116 may be a database or it may be any other data store known to the skilled person. For example, the data repository 116 may store data in a file system instead of a database.

Figure 2:
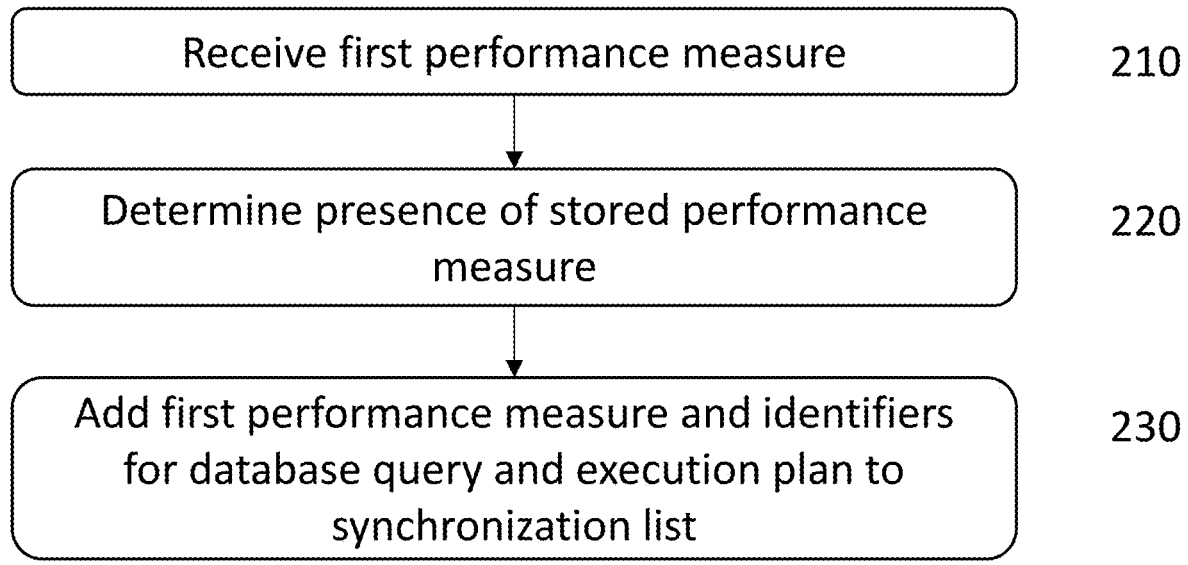
FIG. 2 is a flowchart of a method for determining regression of a database query in accordance with an embodiment of the present invention.

FIG. 2 is a flowchart of a computer-implemented method 200 for determining regression of a database query in accordance with an embodiment of the present invention. The computer-implemented method 200 may, for example, be executed by a processor of a computer system 102 as described above with reference to FIG. 1. Similar to what is described above, the computer system is coupled to a communications network 108. Also coupled to the communications network are a database system 110 providing a database 112 and a data repository system 114 providing a data repository 116. The database system 110 is configured to execute database queries on the database 112. As described above, these may be SQL queries. However, the queries may also be defined in any other database query language known to the skilled person. A database query has one or more execution plans associated with it. Each of these execution plans may have been generated by the database system 110 based on the database query, or they may have been generated by a different computer system and may have been provided to the database system 110 for the corresponding query. The execution plan is a set of low-level instructions for the database system 110 on how to execute the associated database query. In other words, the execution plan is a set of instructions that describes which steps are performed by the database system 110 while executing the database query. Illustratively, a database query submitted to the database system 110 is first parsed and checked for any syntax errors. The output of the parser is then further processed to resolve all objects, tables, and columns in the query and to check the data types involved in the query. This processing results in a process tree and a query identifier, for example a hash value that identifies the query. The database system 110 may then use a stored execution plan associated with the query identifier to execute the query. If there is no stored execution plan, a query optimizer performs a cost-based optimization for the database query. This optimization may be based on statistics, the query process tree, the data accessed by the query, and/or any other constraints given to the database system 110. Based on those inputs, the database system 110 prepares a cost-optimized execution plan associated with the query. The database system 110 also generates a hash value that identifies the execution plan and stores the execution plan for later use. The database system 110 then executes the execution plan and returns the results of the query.

The database system 110 may further provide performance metrics on the executed queries and associated query plans. For example, database 110 may collect metrics on the execution time for execution plans, on the number of executions for different execution plans and/or database queries, and for any other suitable performance metric known to the skilled person. In one example, the database system 110 may generate one or more automatic workload repository snapshots. An automatic workload repository snapshot (AWR) is a collection of database metrics and statistics for a certain time period. For example, the database system 110 may automatically generate an AWR every fifteen minutes, every half hour, every hour, or for any other time suitable time period. The AWR may be stored in the database 112 and may be retrieved at any time. The database system 110 may further be configured to delete AWRs after a certain time period to conserve space in the database 112. Database queries and their associated execution plans may be stored in the AWR using unique identifiers. For example, queries and execution plans may be identified by hash values, such as the hash values generated by database system 110 while generating the execution plan.

The data repository system 114 provides a data repository 116. The data repository system 114 may be another database system, in which case the data repository 116 may be a second database. The data repository system 114 in connection with the data repository 116 may also be any other data storage and retrieval system known to the skilled person. For example, the data repository system 114 may be a computer system executing data storage and retrieval processes, and the data repository 116 may be a file system. It is further expressly contemplated that the data repository system 114 may be part of the database system 110. In that case, the data repository 116 may be a database that is separate from database 112, or it may be part of database 112, such as a table in database 112.

The computer system 102 may execute the method 200 periodically. In one example, the computer system 102 may execute the method 200 at an interval corresponding to the AWR interval. Thus, if an AWR is generated every fifteen minutes, the computer system 102 may also execute method 200 every fifteen minutes, shortly after the AWR has been made available by the database system 110. Similarly, if an AWR is generated every thirty minutes, the computer system 102 may execute method 200 every thirty minutes.

In step 210, the computer system 102 receives a first performance measure for a certain database query that is associated with a first execution plan. The first performance measure may exemplarily be a measure collected and stored by the database system 110. As described above, the first performance measure may be a metric that is based on an automatic workload repository snapshot (AWR). In that case, the database system 110 retrieves the first performance measure from the AWR and provides it to the computer system 102. The first performance measure may also be associated with a time period since a previous execution of the method 200 and/or a previous AWR generation. Illustratively, if the database system 110 generates an AWR every fifteen minutes, the first performance measure may be associated with the fifteen-minute time period between the previous AWR and the current AWR, and/or it may be associated with the time period between the previous execution of the method 200 and the current execution of the method 200. Illustratively, the first performance measure may include an execution time of the database query. The first performance measure may also include an execution count in addition to the execution time. The execution time may indicate how much time the database system 110 spent on execution of the first execution plan, and the execution count may indicate how often the first execution plan was executed The execution time may be generated as an average per execution of the first execution plan during the time period of the AWR, or it may be an aggregate time for all executions of the first execution plan over the time period of the AWR. The database query and first execution plan may be identified by unique identifiers such as hash values.

In step 220, the computer system 102 determines the presence of at least one stored performance measure for the database query and/or the first execution plan in the data repository. Illustratively, the computer system 102 may send a request to data repository system 114 to search for and/or retrieve performance measures associated with the database query and/or the first execution plan from the data repository 116. To that end, the computer system 102 and/or the data repository system 114 may use a hash value that uniquely identifies the database query and/or the first execution plan. The hash value may have been provided to the computer system 102, for example by database system 110, and then transmitted to the data repository system 114. The data repository system 114 retrieves all performance measures associated with the hash value from the data repository 116 and provides them to the computer system 102. If no performance measures are found in the data repository 116, the data repository system 114 indicates that to the computer system 102.

If no performance measure for the database query and/or execution plan are present in the data repository, in step 230, the computer system 102 adds the first performance measure to a synchronization list. The computer system 102 also adds identifiers for the database query and the first execution plan to a synchronization list. These identifiers exemplarily may be hash values that uniquely identify the database query and the execution plan. The synchronization list may be stored in any way known to the skilled person. For example, the synchronization list may be one or more tables in a database, it may be a file in a file system, or it may be stored in the data repository 116.

Figure 3:
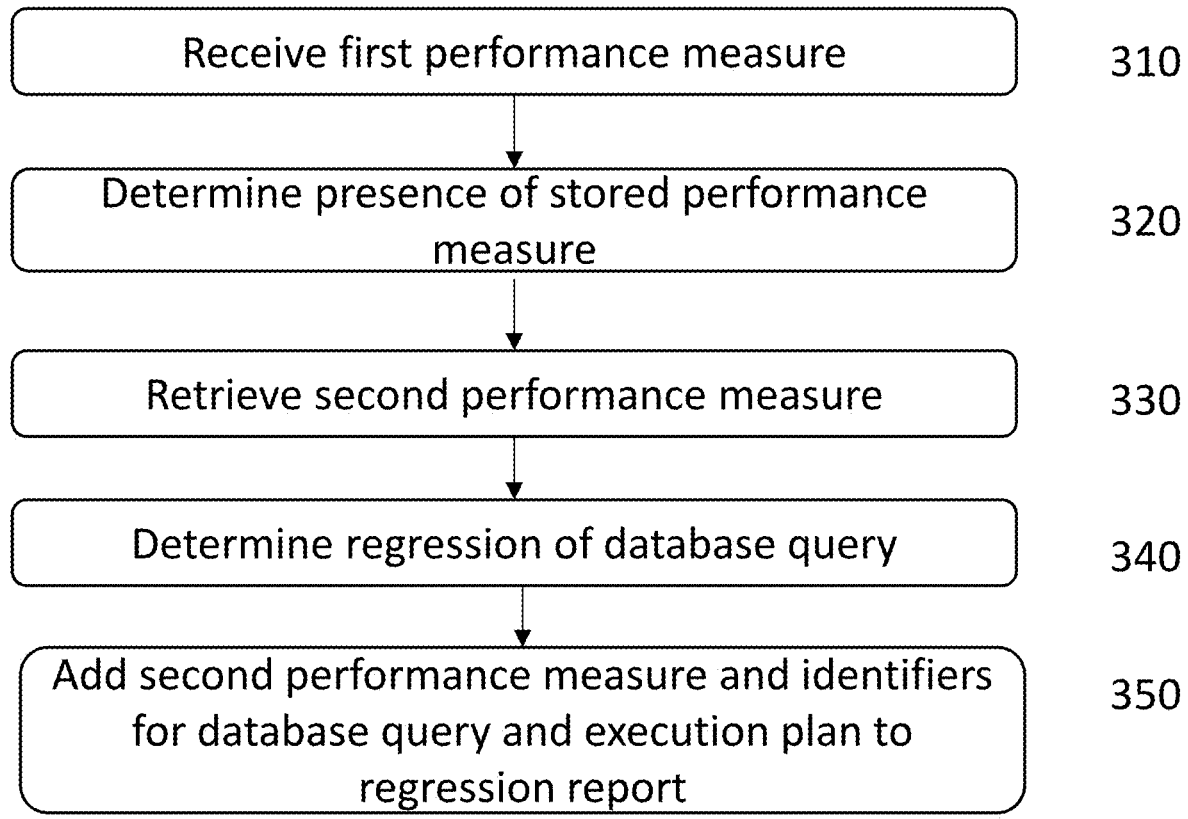
FIG. 3 is a flowchart of a method for determining regression of a database query in accordance with an embodiment of the present invention.

FIG. 3 is a flowchart of a computer-implemented method 300 for determining regression of a database query in accordance with an embodiment of the present invention. The computer-implemented method 300 may, for example, be executed by a processor of a computer system 102 as described above with reference to FIG. 1. Similar to what is described above with reference to FIGS. 1 and 2, the computer system 102 is coupled to a communications network 108. Also coupled to the communications network 108 are a database system 110 providing a database 112 and a data repository system 114 providing a data repository 116.

The computer system 102 may execute the method 300 periodically. In one example, the computer system 102 may execute the method 300 at an interval corresponding to the AWR interval. If an AWR is generated every fifteen minutes, the computer system 102 may execute method 300 every fifteen minutes, shortly after the AWR has been made available by the database system 110. Similarly, if an AWR is generated every thirty minutes, the computer system 102 may execute method 300 every thirty minutes.

In step 310, the computer system 102 receives a first performance measure for a certain database query associated with a first execution plan as described above with reference to step 210 of FIG. 2.

In step 320, the computer system 102 determines the presence of at least one stored performance measure for the database query and/or the first execution plan in the data repository as described above with reference to step 220 of FIG. 2.

If at least one performance measure for the database query is present in the data repository, in step 330, the computer system 102 retrieves a second performance measure associated with a second execution plan from the data repository. The second performance measure may be of the same type as the first performance measure. In other words, if the first performance measure includes execution time, the second performance measure may also include execution time. If the first performance measure includes execution count, the second performance measure may also include execution count. While the use of only one performance measure, the second performance measure, is described herein, it is expressly contemplated that the computer system 102 retrieves more than one stored performance measure, each one associated with a different execution plan for the database query. In that case, the computer system 102 may select one of the retrieved measures as the second performance measure. For example, the computer system 102 may select the performance measure that indicates the shortest execution time of all retrieved measures as the second performance measure and select the execution plan associated with it as the second execution plan.

In step 340, the computer system 102 determines regression of the database query by comparing the first performance measure to the second performance measure. In a simple example, regression may be based on the difference between the first performance measure and the second performance measure. This difference indicates the latency of the first execution plan compared to the second execution plan. If, for example, both the first and the second performance measures indicate execution time, the database query may be regressed if the first performance measure is larger than the second performance measure, or in other words, if the first execution plan led to a longer execution time than the second execution plan that is stored in the data repository. In that case, the second execution plan is more time-efficient than the first execution plan. A threshold may be selected and applied to prevent minor variations in the performance measures leading to a determination of regression. In a different example, regression may be based on execution time and number of executions. Regression may then be calculated as the difference between the first and the second performance measures, in other words the latency of the first execution plan, multiplied by the number of executions:

$$(\text{first\_performance\_measure} - \text{second\_performance\_measure}) \times \text{number\_of\_executions}$$

Additional factors may need to be added to this equation if the units of the first and second performance measures are different from the desired output unit. For example, if the first and second performance measures are execution times in microseconds, the result of the equation needs to be divided by 1,000,000 if the desired output unit for regression is seconds. Basing regression on the number of executions in addition to execution time provides the advantage that a small difference in execution time counts more in a query that is executed often than in query that is only executed a few times. A difference of two seconds between the first and second performance measures would result in a regression of four for a query that is only executed twice, but a regression of 400 for a query that is executed 200 times. This difference is even more important in queries that are executed thousands or millions of times. Illustratively, account balance inquiries from customers all over the world are simple queries, but they are executed very often, and query results need to be provided to the customer immediately. Even a small regression in response time must be avoided for this type of query. The regression equation shown above is sensitive to avoiding small regressions in such high-frequency queries by including the number of executions of the query.

In step 350, the computer system 102, in response to a determination that the database query is regressed, adds the first performance measure, the second performance measure, and identifiers for the database query and the first execution plan to a regression report. The computer system 102 may make the determination whether the database query is regressed based on a threshold. For example, a regression of less than ten may not be large enough to be added to the regression report, while a regression of ten or more would be added to the regression report. The threshold may be set as at any level of the system that is required by the user. For example, the threshold may be set globally, per database system, per database, per table, and/or per query. The database query and first execution plan may be identified by their corresponding hash values. It is also expressly noted that the computer system 102 may add additional information to the regression report. For example, the computer system 102 may add an identifier for the second execution plan to the regression report, and/or the computer system 102 may add all performance measures and execution plans retrieved from the data repository to the regression report.

The regression report may be generated and stored in any form known to the skilled person. Illustratively, the regression report may be a Hypertext Markup Language (HTML) file stored on web server or emailed to a database administrator. In other embodiments, the regression report may be one or more tables in a database, such as database 112. The regression report may also be stored in data repository 116. The computer system 102 may store regression reports for any desired time period. For example, the computer system 102 may store a seven-day history of reports for each database. However, any other time period may be configured by the user. In addition to adding the first execution plan to the regression report, computer system 102 may also be configured to notify a user of the regression. For example, computer system 102 may be configured to notify a database administrator for the database 112 of the regression.

Figure 4:
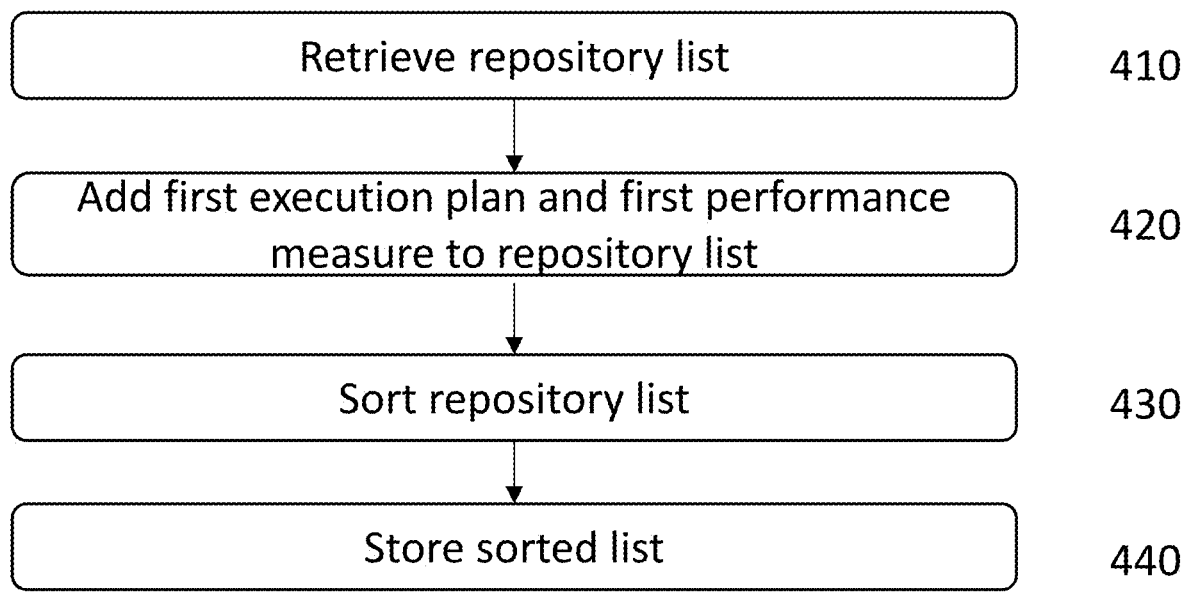
FIG. 4 is a flowchart of a method for determining regression of a database query in accordance with an embodiment of the present invention.

FIG. 4 is a flowchart of a computer-implemented method 400 for determining regression of a database query in accordance with an embodiment of the present invention. The computer-implemented method 400 may, for example, be executed by a processor of a computer system 102 as described above with reference to methods 100, 200, and 300. The computer system 102 may execute method 400 for each database query, associated first execution plan, and associated first performance measure in the synchronization list. This data may have been added to the synchronization list before execution of the method 400, for example by the computer system 102 in step 230 as described above with reference to FIG. 2. The computer system 102 may execute method 400 periodically. In one example, the computer system 102 may execute method 400 once per day. However, it is expressly noted that any other time period may be configured.

In step 410, the computer system 102 retrieves a repository list from the data repository 116. The repository list includes identifiers for one or more third execution plans associated with the database query. The identifiers may be unique hash values generated for each execution plan by the database system 110. The repository list further includes one or more third performance measures, each third performance measure corresponding to a third execution plan. The third performance measure is of the same type as the first performance measure. If the first performance measure includes execution time, the third performance measure also includes execution time. If the first performance measure includes execution count, the third performance measure also includes execution count. In other words, any performance metric included in the first performance measure is also included in the third performance measure. It is also expressly noted that the repository list may be empty because no performance measures and execution plans associated with the database query have been stored in the data repository yet.

In step 420, the computer system 102 adds an identifier for the first execution plan, which may be a hash value associated with the first execution plan generated by the database system 110, to the repository list. The computer system 102 also adds the first performance measure to the repository list.

In step 430, the computer system 102 sorts the repository list. The sorting may be performed based on any suitable metric and using any suitable method known to the skilled person. In an example, the computer system 102 may sort the repository list based on the first and third performance measures. If the first and third performance measures include execution time, the computer system 102 may sort the list based on execution time of the database query. Illustratively, the computer system 102 may sort the repository list so that the execution plan with the shortest execution time is listed first and the execution plan with the longest execution time is listed last. If the first performance measure is smaller than the third performance measure, the first execution plan is listed before the third execution plan. If the first performance measure is larger than the third performance measure, the first execution plan is listed after the third execution plan.

In step 440, the computer system 102 stores the sorted repository list in the data repository 116. The computer system 102 may store the sorted list to replace the list retrieved in step 410, or it may store the sorted list in addition to the list retrieved in step 410. The computer system 102 may then use the sorted repository list at a later time, for example to determine the presence of a stored performance measure in step 220 as described above with reference to FIG. 2. It also expressly noted that the computer system 102 and/or the data repository system 114 may delete the data in the data repository 116 after a certain time period. For example, the computer system 102 and/or the data repository system 114 may be configured to retain query performance data for each repository list for 90 days. Exemplarily, the computer system 102 may additionally delete entries from the repository list or the sorted repository list that older than 90 days to conserve storage space. Any suitable time period may be selected for this retention period.

FIG. 5 shows exemplary query statistics and an exemplary regression report in accordance with an embodiment of the present invention. Exemplary query statistics 502 are generated by the database system 110, for example as part of an AWR. As described above, the statistics may cover a certain time period. The statistics 502 include an identifier for the corresponding AWR snapshot, in this case 342598, which covers fifteen minutes between 1:00 and 1:15. The statistics 502 further include identifiers for the SQL database queries in the column SQL_ID and identifiers for the associated execution plans in the column PHV. The identifiers may be hash values, or they may be any other suitable identifier known to the skilled person. The statistics 502 further include values for the numbers of executions of the query during the time period (EXEC_DELTA), the execution time for each query over the entire time period (ELAP_TIME_DELTA), and additional performance metrics such as the number of buffer gets and affected rows per query for the entire time period (BUFFER_GETS_DELTA and ROWS_DELTA, respectively).

Exemplary regression report 504 may be generated by the method 300 described above with reference to FIG. 3. While a database table is shown here, the regression report 504 may also be generated in any other suitable form, such as an HTML report. In some embodiments, the database table 504 may be used by method 300 or another process executing on computer system 102 to generate an HTML report. The regression report 504 includes each execution plan that was determined to be regressed by the method 300 described herein. The report 504 includes columns identifying the current execution plan (CURR_PHV) associated with a particular query (SQL_ID) and the best execution plan (BEST_PHV) associated with the query. The report 504 further includes current execution times versus best execution times and a value quantifying the regression calculated by the method described herein. Here, the regression was calculated in seconds according to the equation shown above with reference to step 340. A threshold was set at greater than 100 seconds of regression, so that only the first four rows are included in the report. As can be seen in report 504, a query may be regressed even if the current and best execution plans are the same. In that case, regression may have been caused by other factors, such as system load and/or resource constraints.

Figure 6:
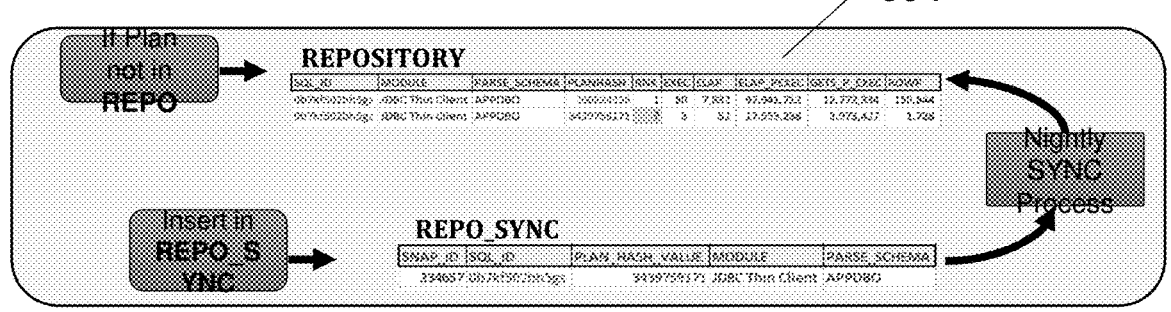
FIG. 6 shows exemplary query statistics and data repository information in accordance with an embodiment of the present invention.

FIG. 6 shows exemplary query statistics and data repository information in accordance with an embodiment of the present invention. Exemplary query statistics 602 are generated by the database system 110 and evaluated by the methods 200, 300, and 400 described above with reference to FIGS. 2, 3, and 4. The first row in the statistics table 602 indicates an execution plan with hash value 3439759171 for a certain SQL query. The method 200 and/or 300 described above determines whether an entry for the database query and/or the execution plan already exists in the data repository 604. Here, the data repository 604 includes an entry for the query, but that entry is associated with a different execution plan, namely plan 260224386. Therefore, the method 200 and/or 300 adds the execution plan 3439759171 to the synchronization list. Method 400, which for example may be executed nightly, evaluates the synchronization list and retrieves a repository list 604 from the data repository 116. The method 400 then adds the execution plan 3439759171 and its corresponding performance measures to the repository list. Finally, the method 400 sorts the repository list and stores the sorted repository lists 606 in the data repository 116. Repository list 606 illustrates the sorted repository list. Execution plan 3439759171 has been added above the already existing execution plan for the same query, because its performance measures are better than the performance measures for the existing plan 260224386.

Figure 7:
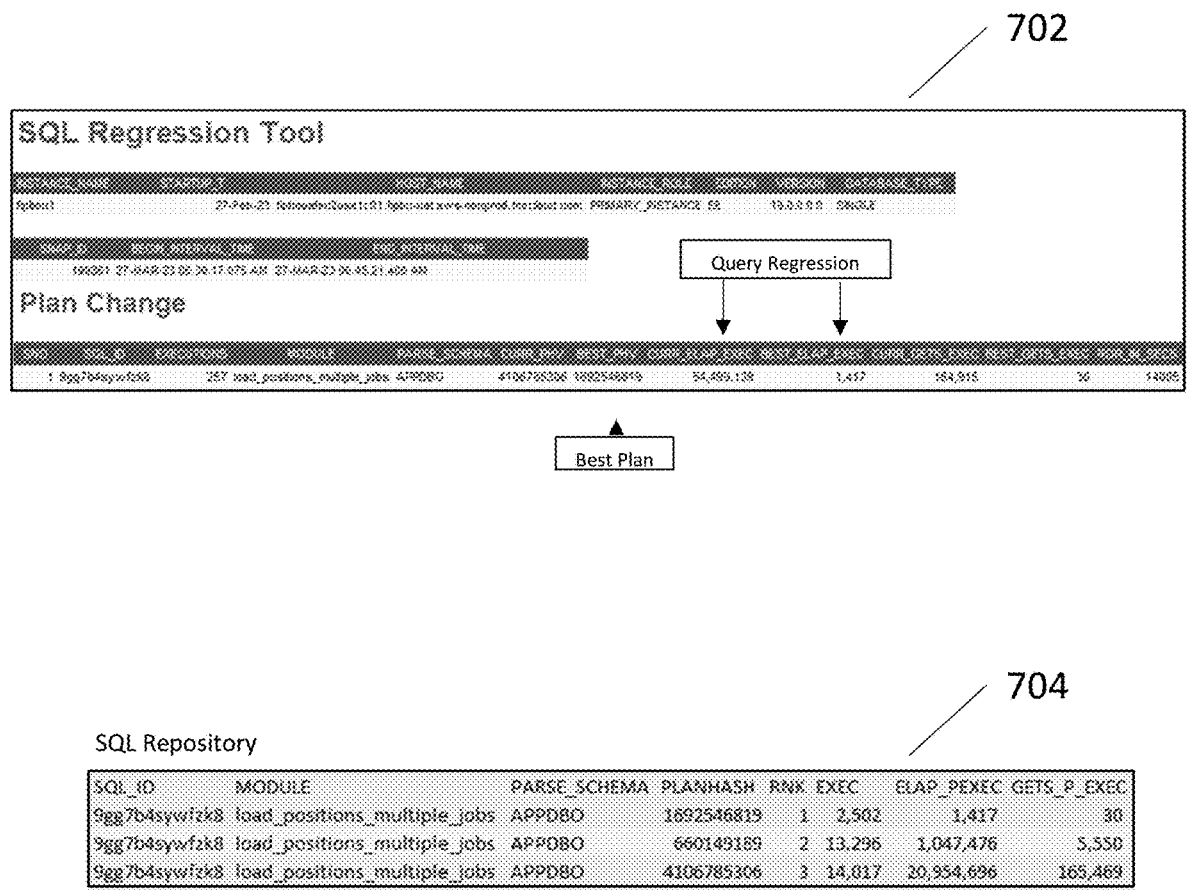
FIG. 7 shows an exemplary regression report and corresponding exemplary repository data in accordance with an embodiment of the present invention.

FIG. 7 shows an exemplary regression report 702 and corresponding exemplary repository data 704 in accordance with an embodiment of the present invention. Data repository list 704 includes three different execution plans for the given database query identified in the column SQL_ID. The execution plans, identified by their hash values in the column PLANHASH, have execution times shown in the column ELAP_PEXEC. As can be seen, the execution plan identified by the hash value 1692546819 has the shortest execution time and therefore the best performance measure. Exemplary regression report 702 may be generated by the method 300 described above. The regression report includes the database query identified by SQL_ID and the current execution plan associated with that query shown in CURR_PHV. After method 300 retrieves the repository data 704 and determines the best execution plan already known, method 300 then may determine that the current plan is regressed compared to the best execution plan known. Method 300 may therefore add identifiers for the current plan and the best-known plan to the regression report 702. Method 300 may also add further identifiers to the regression report 702, such as performance measures for the current plan (CURR_ELAP_EXEC and CURR_GETS_EXEC) and the best-known plan (BEST_ELAP_EXEC and BEST_GETS_EXEC). Method 300 may also add a regression value to the regression report 702, such as the regression of the current execution plan in seconds (RGR_IN_SECS).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

The computer program can be deployed in a cloud computing environment (e.g., Amazon® AWS, Microsoft® Azure, IBM® Cloud™). A cloud computing environment includes a collection of computing resources provided as a service to one or more remote computing devices that connect to the cloud computing environment via a service account—which allows access to the aforementioned computing resources. Cloud applications use various resources that are distributed within the cloud computing environment, across availability zones, and/or across multiple computing environments or data centers. Cloud applications are hosted as a service and use transitory, temporary, and/or persistent storage to store their data. These applications leverage cloud infrastructure that eliminates the need for continuous monitoring of computing infrastructure by the application developers, such as provisioning servers, clusters, virtual machines, storage devices, and/or network resources. Instead, developers use resources in the cloud computing environment to build and run the application, and store relevant data.

Method steps can be performed by one or more processors executing a computer program to perform functions of the invention by operating on input data and/or generating output data. Subroutines can refer to portions of the stored computer program and/or the processor, and/or the special circuitry that implement one or more functions. Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Exemplary processors can include, but are not limited to, integrated circuit (IC) microprocessors (including single-core and multi-core processors). Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), an ASIC (application-specific integrated circuit), Graphics Processing Unit (GPU) hardware (integrated and/or discrete), another type of specialized processor or processors configured to carry out the method steps, or the like.

Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices (e.g., NAND flash memory, solid state drives (SSD)); magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above-described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). The systems and methods described herein can be configured to interact with a user via wearable computing devices, such as an augmented reality (AR) appliance, a virtual reality (VR) appliance, a mixed reality (MR) appliance, or another type of device. Exemplary wearable computing devices can include, but are not limited to, headsets such as Meta™ Quest 3™ and Apple® Vision Pro™. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN)), a private IP network, an IP private branch exchange (IPBX), a wireless network (e.g., radio access network (RAN), Bluetooth™, near field communications (NFC) network, Wi-Fi™, WiMAX™, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), cellular networks, and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE), cellular (e.g., 4G, 5G), and/or other communication protocols.

Devices of the computing system can include, for example, a computer, a computer with a browser device, a telephone, an IP phone, a mobile device (e.g., cellular phone, personal digital assistant (PDA) device, smartphone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Safari™ from Apple, Inc., Microsoft® Edge® from Microsoft Corporation, and/or Mozilla® Firefox from Mozilla Corporation). Mobile computing devices include, for example, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The methods and systems described herein can utilize artificial intelligence (AI) and/or machine learning (ML) algorithms to process data and/or control computing devices. In one example, a classification model, is a trained ML algorithm that receives and analyzes input to generate corresponding output, most often a classification and/or label of the input according to a particular framework.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting the subject matter described herein.

What is claimed is:

1. A computer-implemented method for determining regression of a database query associated with a first execution plan, using a computer system coupled to a data repository, the method comprising:

receiving, by the computer system, a first performance measure for the database query and the first execution plan;

determining, by the computer system, a presence of at least one stored performance measure for the database query in the data repository;

in response to a determination that the at least one stored performance measure for the database query is for a different execution plan than the first execution plan:
adding, by the computer system, the first performance measure and identifiers for the database query and the first execution plan to a synchronization list,
retrieving, by the computer system, a repository list including identifiers for one or more third execution plans and third performance measures associated with the database query from the data repository, and
adding, by the computer system, the identifier for the first execution plan and the first performance measure from the synchronization list to the repository list in association with the database query;

in response to a determination that at least one stored performance measure for the database query is present in the data repository:
retrieving, by the computer system, a second performance measure associated with a second execution plan from the data repository;
calculating, by the computer system, a difference between the first performance measure and the second performance measure;
multiplying, by the computer system, the calculated difference by a number of executions of the first execution plan to generate the regression of the database query in a first unit of measure;
converting, by the computer system, the regression of the database query into a different unit of measure that corresponds to a unit of measure of the first performance measure and the second performance measure; and
analyzing, by the computer system, the converted regression to determine whether the database query is regressed; and in response to a determination that the database query is regressed, adding, by the computer system, the first performance measure, the second performance measure, and identifiers for the database query and the first execution plan to a regression report.

2. The computer-implemented method of claim 1, further comprising, for each database query, associated first execution plan, and associated first performance measure in the synchronization list:
sorting, by the computer system, the repository list after adding the identifier for the first execution plan and the first performance measure from the synchronization list; and
storing, by the computer system, the sorted repository list in the data repository.

3. The computer-implemented method of claim 2, wherein the sorting is based on the first and third performance measures.

4. The computer-implemented method of claim 1, wherein the first and second performance measures include execution time.

5. The computer-implemented method of claim 4, wherein the second performance measure includes the shortest execution time of all performance measures associated with the database query in the data repository.

6. The computer-implemented method of claim 1, wherein receiving the first performance measure is based on an automatic workload repository snapshot.

7. The computer-implemented method of claim 1, wherein the method is executed periodically by the computer system.

8. The computer-implemented method of claim 7, wherein the first performance measure is associated with a time period since a previous execution of the method.

9. The computer-implemented method of claim 1, wherein determining the regression of the database query is further based on a threshold.

10. The computer-implemented method of claim 1, wherein determining the regression of the database query includes determining one or both of a latency and an execution count of the database query.

11. A system for determining regression of a database query associated with a first execution plan, the system comprising:
a computer system having a processor coupled to a memory; and
a data repository coupled to the computer system, wherein the processor is configured to:
receive a first performance measure for the database query and the first execution plan;
determine a presence of at least one stored performance measure for the database query in the data repository;
in response to a determination that the at least one stored performance measure for the database query is for a different execution plan than the first execution plan:
add the first performance measure and identifiers for the database query and the first execution plan to a synchronization list,
retrieve a repository list including identifiers for one or more third execution plans and third performance measures associated with the database query from the data repository, and
add the identifier for the first execution plan and the first performance measure from the synchronization list to the repository list in association with the database query;
in response to a determination that at least one stored performance measure for the database query is present in the data repository:
retrieve a second performance measure associated with a second execution plan from the data repository;
calculate a difference between the first performance measure and the second performance measure;
multiply the calculated difference by a number of executions of the first execution plan to generate the regression of the database query in a first unit of measure;
convert the regression of the database query into a different unit of measure that corresponds to a unit of measure of the first performance measure and the second performance measure; and
analyze the converted regression to determine whether the database query is regressed; and
in response to a determination that the database query is regressed, add the first performance measure, the second performance measure, and identifiers for the database query and the first execution plan to a regression report.

12. The system of claim 11, wherein the processor is further configured to, for each database query, associated first execution plan, and associated first performance measure in the synchronization list:

sort the repository list after adding the identifier for the first execution plan and the first performance measure from the synchronization list; and store the sorted repository list in the data repository.

13. The system of claim 12, wherein the processor is configured to sort the repository list based on the first and third performance measures.

14. The system of claim 11, wherein the first and second performance measures include execution time.

15. The system of claim 14, wherein the second performance measure includes the shortest execution time of all performance measures associated with the database query in the data repository.

16. The system of claim 11, wherein the processor is configured to receive the first performance measure from an automatic workload repository snapshot.

17. The system of claim 11, wherein the first performance measure is associated with a time period.

18. The system of claim 11, wherein the processor is configured to determine the regression of the database query based on a threshold.

19. The system of claim 11, wherein the processor is configured to determine the regression of the database query based on one or both of a latency and an execution count of the database query.

20. A non-transitory computer-readable medium having software encoded thereon, the software, when executed by one or more computer systems coupled to a data repository, operable to:

receive a first performance measure for a database query and a first execution plan associated with the database query;

determine a presence of at least one stored performance measure for the database query in the data repository;

in response to a determination that the at least one stored performance measure for the database query is for a different execution plan than the first execution plan:

add the first performance measure and identifiers for the database query and the first execution plan to a synchronization list, retrieve a repository list including identifiers for one or more third execution plans and third performance measures associated with the database query from the data repository, and add the identifier for the first execution plan and the first performance measure from the synchronization list to the repository list in association with the database query;

in response to a determination that at least one stored performance measure for the database query is present in the data repository:

retrieve a second performance measure associated with a second execution plan from the data repository;

calculate a difference between the first performance measure and the second performance measure;

multiply the calculated difference by a number of executions of the first execution plan to generate the regression of the database query in a first unit of measure;

convert the regression of the database query into a different unit of measure that corresponds to a unit of measure of the first performance measure and the second performance measure; and analyze the converted regression to determine whether the database query is regressed; and in response to a determination that the database query is regressed, add the first performance measure, the second performance measure, and identifiers for the database query and the first execution plan to a regression report.

* * * * *